United States Patent
Nishio

(10) Patent No.: US 7,738,159 B2
(45) Date of Patent: Jun. 15, 2010

(54) DEFORMABLE MIRROR SYSTEM AND DEFORMABLE MIRROR DRIVE DEVICE

(75) Inventor: Masahiro Nishio, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/393,367

(22) Filed: Feb. 26, 2009

(65) Prior Publication Data

US 2009/0219598 A1 Sep. 3, 2009

(30) Foreign Application Priority Data

Feb. 28, 2008 (JP) .............................. 2008-048731

(51) Int. Cl.
*G02B 26/00* (2006.01)
*G02B 26/08* (2006.01)

(52) U.S. Cl. ..................... 359/290; 359/221.2; 359/291

(58) Field of Classification Search ............. 359/221.2, 359/247, 290–292, 295, 302
See application file for complete search history.

(56) References Cited

U.S. PATENT DOCUMENTS

| 7,088,492 B2 * | 8/2006 | Yanagita et al. ............. 359/290 |
| 7,190,500 B2 | 3/2007 | Ide et al. |

\* cited by examiner

*Primary Examiner*—William C Choi
(74) *Attorney, Agent, or Firm*—Scully, Scott, Murphy & Presser, P.C.

(57) ABSTRACT

A deformable mirror system includes a deformable mirror, which comprises a deformation part with a reflection surface formed thereon, a fixing part configured to fix the deformation part, and a pair of electrodes disposed facing the deformation part and the fixing part, respectively, and a deformable mirror drive device. The deformable mirror drive device includes a drive unit configured to generate drive force so as to deform the deformation part, a capacitance detection unit configured to detect capacitance between the pair of electrodes, a conversion unit configured to convert a target deformation quantity signal into a target capacitance signal on the basis of a relationship between the capacitance and deformation quantity of the deformation part, and a control unit configured to decide drive force generated from the drive unit so as to coincide an output from the conversion unit with an output from the capacitance detection unit.

34 Claims, 5 Drawing Sheets

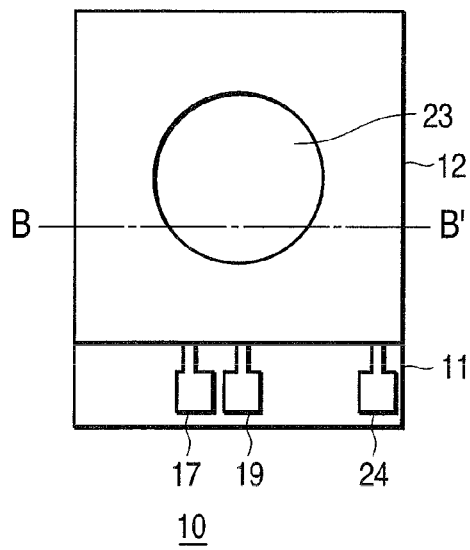
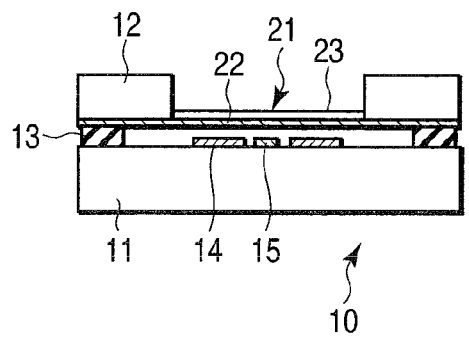
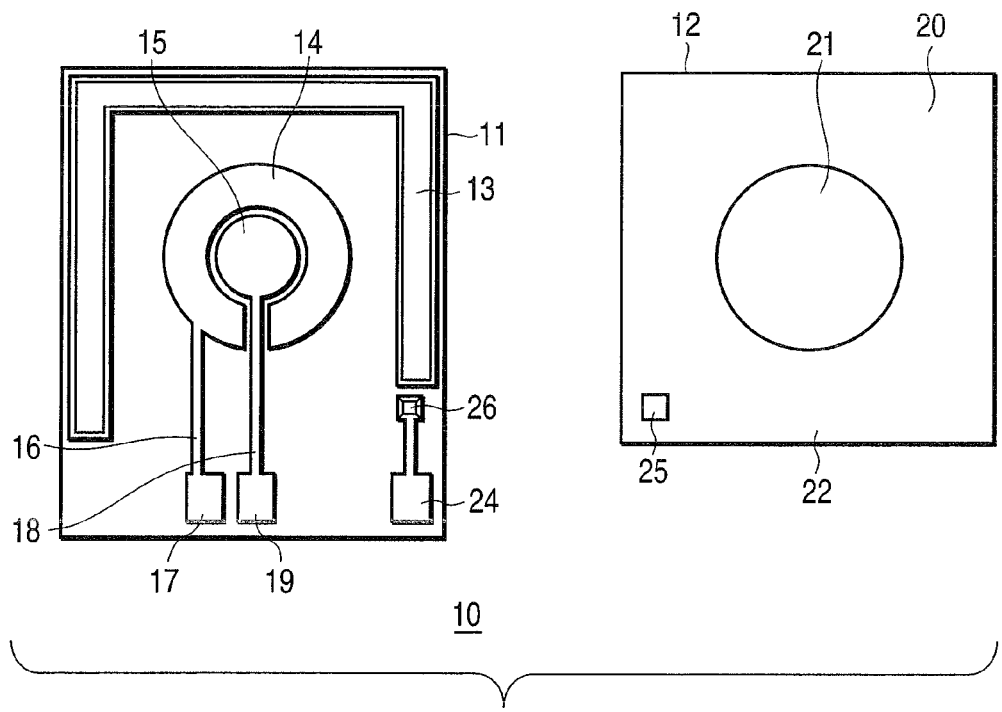
FIG. 1A
FIG. 1B
FIG. 2

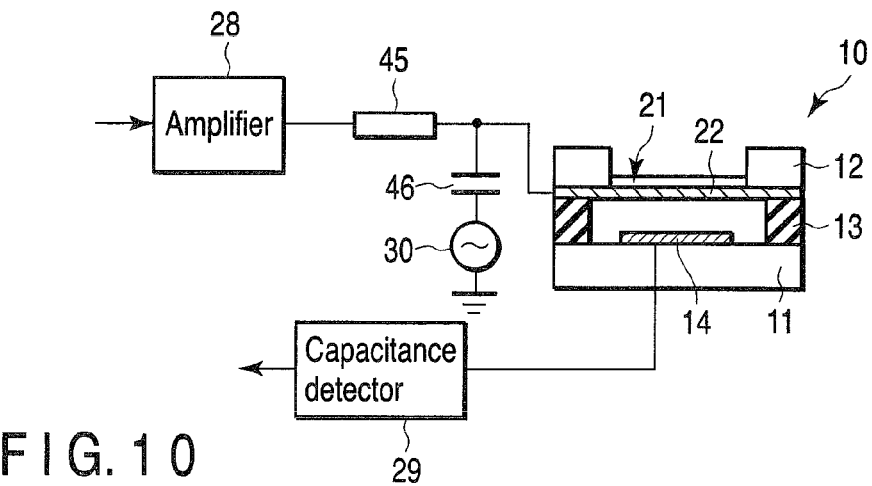
F I G. 10
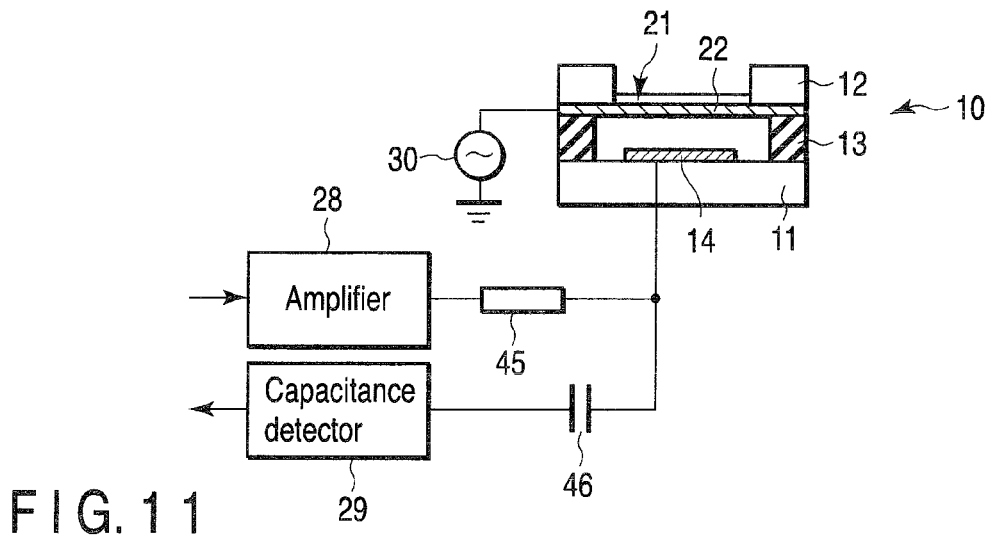
F I G. 11
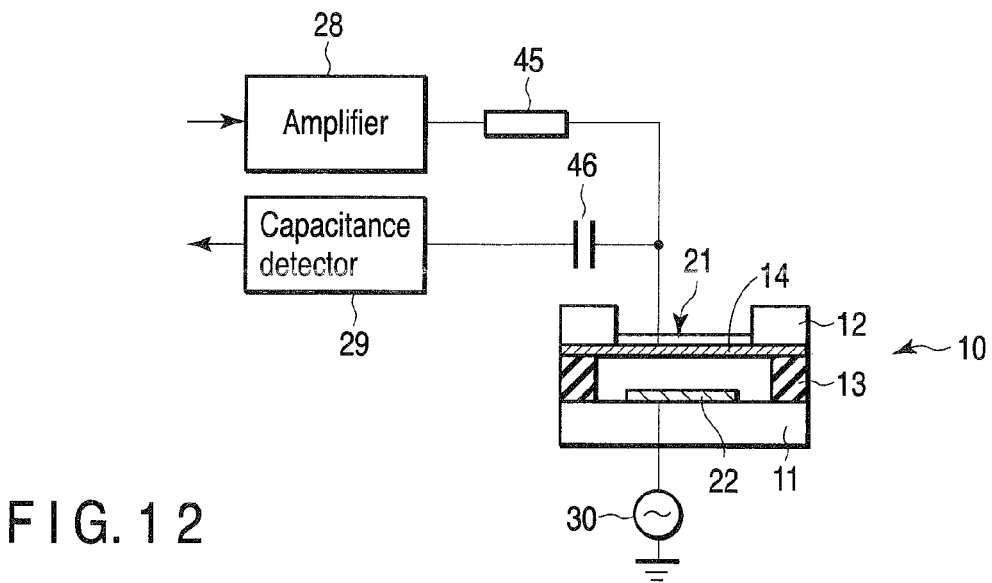
F I G. 12

DEFORMABLE MIRROR SYSTEM AND DEFORMABLE MIRROR DRIVE DEVICE

CROSS-REFERENCE TO RELATED APPLICATIONS

This application is based upon and claims the benefit of priority from prior Japanese Patent Application No. 2008-048731, filed Feb. 28, 2008, the entire contents of which are incorporated herein by reference.

BACKGROUND OF THE INVENTION

1. Field of the Invention

The present invention relates to a deformable mirror system composed of a deformable mirror configured to deform a shape of a reflection surface by using an electrostatic drive and of a deformable mirror drive device for driving the deformable mirror, and to a deformable mirror drive device for use in the system.

2. Description of the Related Art

In recent years, a deformable mirror configured to deform a reflection surface by using electrostatic drive, by applying a, so-called, micro-electro-mechanical system (MEMS) technique using a semiconductor manufacturing technology has been widely noticed.

In such a deformable mirror, it is required for obtaining desired reflection to measure a deformation quantity of the reflection surface. As regards a method for measuring a deformation quantity, a method for measuring a change in capacitance is disclosed; for example, in U.S. Pat. No. 7,190,500.

A deformable mirror disclosed in the U.S. Patent is provided with a flexible thin film and a control electrode. The flexible thin film includes a reflection surface to be deformed by electrostatic attractive force and an upper electrode. The control electrode is an electrode which is arranged facing the thin film and partly works for control and for detecting capacitance. Applying a voltage between the upper electrode and the control electrode generates electrostatic drive force and deforms the reflection surface. A capacitance detection circuit measures capacitance between the upper electrode and the control electrode to calculate the deformation quantity of the reflection surface.

The U.S. Patent discloses the following detection method. The method applies a high voltage from a constant voltage source to the control electrode through a resistor. Here, applying a high-frequency voltage from a high-frequency power source to a capacitance detection electrode that is the control electrode varies potential at the control electrode. These variations are monitored as changes in electric current by means of the capacitance detection circuit through the upper electrode. The capacitance, namely, the deformation quantity of the reflection surface is detected based on a phase and amplitude of the current detect.

The U.S. Patent discloses the foregoing method for detecting the deformation quantity of the reflection surface. However, the U.S. patent does not disclose a way how to control a voltage to be applied between the upper electrode and the control electrode of the deformable mirror by using the detected magnitude of the deformation.

The present invention has been made in consideration of the above point, and an object of the invention is to provide a deformable mirror system and a deformable mirror drive device which are configured to precisely drive a deformable mirror by detecting the deformation quantity of a reflection surface and by controlling the voltage to be applied between electrodes by using the detected deformation quantity.

BRIEF SUMMARY OF THE INVENTION

According to one aspect of the present invention, there is provided a deformable mirror system comprising:

a deformable mirror which comprises a deformation part with a reflection surface formed thereon, a fixing part configured to fix the deformation part, and a pair of electrodes disposed facing the deformation part and the fixing part, respectively;

a drive unit configured to generate drive force so as to deform the deformation part;

a capacitance detection unit configured to detect capacitance between the pair of electrodes;

a conversion unit configured to convert a target deformation quantity signal into a target capacitance signal on the basis of a relationship between the capacitance and deformation quantity of the deformation part; and a control unit configured to decide drive force generated from the drive unit so as to coincide an output from the conversion unit with an output from the capacitance detection unit.

According to another aspect of the present invention, there is provided a deformable mirror drive device comprising:

a drive unit configured to generate drive force so as to deform a deformation part of a deformable mirror which includes the deformation part with a reflection surface formed thereon, a fixing part configured to fix the deformation part, and a pair of electrodes disposed so as to face the deformation part and the fixing part, respectively;

a capacitance detection unit configured to detect capacitance between the pair of the electrodes of the deformable mirror;

a conversion unit configured to convert a target deformation quantity signal into a target capacitance signal on the basis of a relationship between the capacitance and deformation quantity of the deformation part; and a control unit configured to decide drive force generated from the drive unit so as to coincide an output from the conversion unit with an output from the capacitance detection unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is an exemplary upper surface view of a deformable mirror in a deformable mirror system of a first embodiment of the invention;

FIG. 1B is an exemplary cross-sectional view taken on line B-B' of FIG. 1A;

FIG. 2 is an exemplary decomposition view of the deformable mirror;

FIG. 10 is an exemplary view depicting a configuration of a modification example of the deformable mirror system of the second embodiment;

FIG. 11 is an exemplary view depicting a configuration of another modification example of the deformable mirror system of the second embodiment; and FIG. 12 is an exemplary view depicting a configuration of further modification example of the deformable mirror system of the second embodiment.

DETAILED DESCRIPTION OF THE INVENTION

Figure 3:
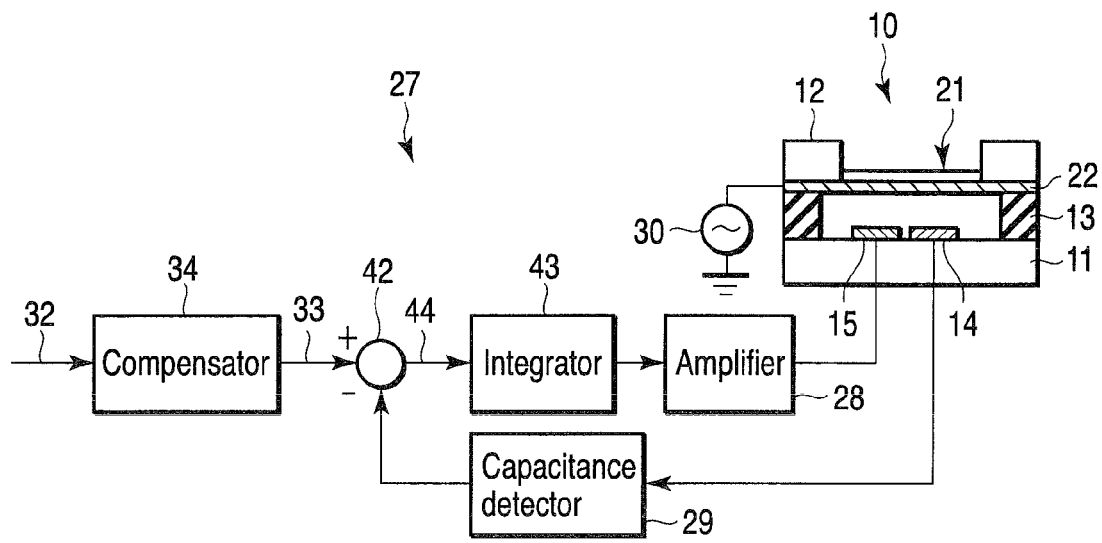
FIG. 3 is an exemplary view depicting a configuration of the deformable mirror system of the first embodiment.

Hereinafter, excellent embodiments for performing the present invention will be described with reference to the drawings.

First Embodiment

[Description of Device Structure]

A device structure of a deformable mirror of a deformable mirror system of a first embodiment of the invention will be firstly described with reference to FIGS. 1A, 1B and 2.

As shown in these FIGS., a deformable mirror 10 is composed of an electrode substrate 11 and a mirror substrate 12. The electrode substrate 11 and the mirror substrate 12 are fixed through a spacer 13.

A second electrode 14 and a third electrode 15 are arranged on the electrode substrate 11. The second electrode 14 is electrically connected to a second lead-out electrode 17 by means of wiring 16, and the third electrode 15 is electrically connected to a third lead-out electrode 19 by means of wiring 18.

The mirror substrate 12 is composed of a support unit 20 and a deformation part 21. The support unit 20 supports the deformation part 21 and also operates as a fixation unit for fixing the mirror substrate 12 to the electrode substrate 11 through the spacer 13. In this case, the fixation unit fixes the deformation part 21 formed on the mirror substrate 12 so as to be placed in the position facing the second and the third electrodes 14, 15.

Further, a conductive material such as metal is formed on a whole of a surface facing the second and the third electrodes 14, 15 on the mirror substrate 12, and the conductive material is used as a first electrode 22. The surface with the first electrode 22 formed thereon is set as a rear surface, and a reflection surface 23 forming a film of metal on the deformation part 21 is formed on the surface of the mirror substrate 12. While the material to be formed as the film as the reflection surface 23 differs in specification of the deformable mirror 10, aluminum, gold or a dielectric multilayer film may be used frequently. The surface of an oxidative metal such as aluminum is further applied coating with silicon oxide, etc.

The spacer 13 is used for fixing the electrode substrate 11 and the mirror substrate 12 while deciding the interval therebetween. An inorganic material, such as a glass and a silicon substrate or metal, may be frequently used for the spacer 13; however, organic adhesive containing beads for deciding the interval may be used.

The first electrode 22 of the mirror substrate 12 is electrically connected to a first lead-out electrode 24 formed on the electrode substrate 11. Therefore, a part of the first electrode 22 disposed at the support unit 20 on the mirror substrate 12 is set as a connection unit 25. For fixing the mirror substrate 12, the connection unit 25 is electrically connected to a conductive material for electrical connection 26 formed on the electrode substrate 11. The connection unit 25 may be connected through pressure welding of metal, and may be connected with conductive paste, etc. As a result, the first electrode 22 on the mirror substrate 12 and the first lead-out electrode 24 on the electrode substrate 11 are electrically connected.

Electrical connection (not shown) from the first, second and third lead-out electrodes 24, 17, 19 to an external drive device for the deformable mirror is performed through wire bonding usually.

[Description of Drive Principle]

The following will describe a deformable mirror drive device 27 driving the deformable mirror 10 structured as mentioned above.

The deformable mirror 10 of the structure described above adopts an electrostatic drive system deforming the reflection surface 23 on the deformation part 21 by electrostatic force. The deformable mirror drive device 27, as shown in FIG. 3, applies a voltage to the third electrode 15 of the deformable mirror 10 by means of an amplifier 28 to generate a potential difference between the first electrode 22 and the third electrode 15. Thereby, attractive force caused by the electrostatic force occurs to deform the reflection surface 23 together with the deformation part 21 toward the electrode substrate 11 of the deformable mirror 10.

The deformation quantity of the reflection surface 23 may be varied in accordance with the potential difference applied between the first electrode 22 and the third electrode 15.

The space between the electrode 11 and the mirror substrate 12 decided in accordance with the height of the spacer 13 may be decided from a maximum deformation quantity of the reflection surface 23. Generally, a substrate space of about three times or more of the maximum deformation quantity is required.

[Description of Capacitance Detection]

Applying a potential difference between the first electrode 22 and the third electrode 15 to deform the deformation part 21 reduces the space (an electrostatic gap) between the first electrode 22 and the second electrode 14. With the reduction in electrostatic gap, capacitance of the first electrode 22 and the second electrode 14 (capacitance of the deformable mirror 10) increases. Thus, detecting the capacitance of the deformable mirror 10 to derive the electrostatic gap enables detecting the deformation quantity of the reflection face 23.

A deformation quantity $\Delta d$ of the reflection surface 23 and the capacitance of the deformable mirror 10 are in inverse proportion to each other as expressed by the following equation (1), and also a capacitance C detected has nonlinearity to the deformation quantity $\Delta d$.

$$C = \varepsilon A/(d_0 - \Delta d) \quad (1)$$

Wherein ∈ is a dielectric constant, A is an area of an electrode, $d_0$ is an initial magnitude of a space between electrodes, $\Delta d$ is a deformation magnitude of the reflection surface 23.

In the deformable mirror drive device 27 of the embodiment, a capacitance detector 29 for detecting capacitance is connected to the second electrode 14. A reference signal generator 30 generating a reference signal required to detect the capacitance is connected to the first electrode 22. The capacitance detector 29 detects the capacitance of the deformable mirror 10 (the capacitance between the first electrode 22 and the second electrode 14) to output a capacitance signal 31. The reference signal supplied to the first electrode 22 is a periodical signal, and the use, for example, of a sine wave, a rectangular wave, a triangle wave, and further, a periodical arbitrary wave form is a possible approach. Supplying such a reference signal to a capacitance, detecting an electric current flowing in the capacitance by means of the capacitance detector 29, or detecting electric charges charged in the capacitance by means of the capacitance detector 29 make it possible to detect a capacitance.

The reference signal generates the drive force, as well as works as the detector of the capacitance. Accordingly, it is necessary to make the frequency of the reference signal sufficiently higher than a frequency band capable of driving the deformation part 21, and it is desired to be set so as to avoid high order resonance frequencies of the deformation part 21.

[Description of Control Unit]

A target deformation quantity signal 32 inputted from outside is converted into a target capacitance signal 33 by means of a compensator 34. That is, the compensator 34 converts to output the target capacitance signal 33 indicating the capacitance of the deformable mirror 10 at the deformation quantity corresponding to the input target deformation quantity signal 32 on the basis of the relationship having the non-linearity between the capacitance of the deformable mirror 10 and the deformation quantity of the deformation part 21 expressed by the equation (1).

Hereinafter, while an example of a configuration of the compensator 34 will be described, it is needless to say that the invention is not limited to the example of this configuration.

Figure 4:
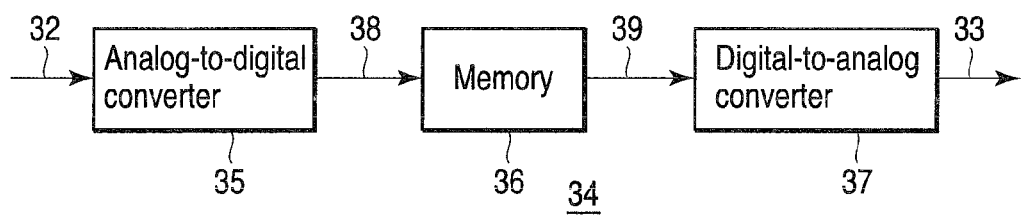
FIG. 4 is an exemplary view depicting a configuration example of a compensator in FIG. 3.

That is the compensator 34 is composed of an analog-to-digital converter 35, a memory 36, and a digital-to-analog converter 37, as shown in FIG. 4. The analog-to-digital converter 35 digitizes the target deformation quantity signal 32, and inputs a digitized target deformation quantity signal 38 as an address to the memory 36. From the output of the memory 36, a digitized target capacitance signal 39 is output. The digital-to-analog converter 37 converts the value of the digitized target capacitance signal 39 into an analog signal to output as a target capacitance signal 33.

The relationship between the capacitance and the deformation quantity of the deformable mirror 10 has been written as a conversion table in the memory 36 in advance. More specifically, at an address corresponding to the digitized deformation quantity, the capacitance in the time of the quantity of the deformation is digitized to write. Thereby, deciding the address of the memory 36 by the digitized target deformation quantity signal 38 enables obtaining the digitized target capacitance signal 39 from the output of the memory 36. Thus, the target capacitance signal 33 that is the capacitance corresponding to the target deformation signal 32 which has been input to the compensator 34 may be obtained.

Figure 5:
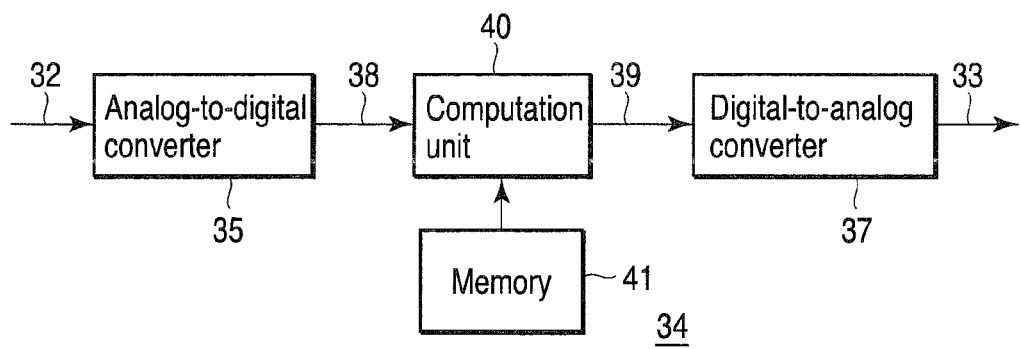
FIG. 5 is an exemplary view depicting another configuration example of the compensator in FIG. 3.

Alternatively, the compensator 34 may adopt a form composed of the analog-to-digital converter 35, the digital-to-analog converter 37, a computation unit 40 and a memory 41, as shown in FIG. 5. That is, the analog-to-digital converter 35 digitizes the target deformation signal 32, and sets the digitized target deformation signal 38 as an input value to the computation unit 40. Meanwhile, parameters of the computation unit 40 are stored in the memory 41. The computation unit 40 computes the input value by using the parameter values in the memory 41, and outputs the computation result as the digitized target capacitance signal 39. The digital-to-analog converter 37 converts the digitized target capacitance signal 39 into an analog signal to result in the target capacitance signal 33, and the target capacitance signal 33 is output from the compensator 34.

Here, the computation unit 40 has been set in advance so as to compute in accordance with the equation (1). The dielectric constant ∈, the area of the electrode A, and the initial magnitude $d_0$ have been stored in the memory 41. Thereby, the target capacitance signal 33 that is the capacitance corresponding to the target deformation quantity signal 32 input to the compensator 34 may be obtained.

The target capacitance signal 33 from the compensator 34 is input to a comparator 42. The comparator 42 compares the target capacitance signal 33 from the compensator 34 with the capacitance signal 31 from the capacitance detector 29, and outputs the difference as a capacitance-value error 44 to an integrator 43.

The integrator 43 integrates the capacitance-value error 44 input from the comparator 42. The integration result is amplified by the amplifier 28 to be output to the third electrode 15 of the deformable mirror 10.

According to the foregoing configuration of the deformable mirror drive device 27, in a state in which a sufficient time for operating the integrator 43 has elapsed, the voltage of the third electrode 15 of the deformable mirror 10 is defined so that the capacitance-value error 44 becomes zero. In other words, the state is a case in which the target capacitance signal 33 and the capacitance signal 31 coincides with each other, the voltage of the third electrode 15 is decided so that the deformation quantity corresponding to the target deformation quantity signal 32 is obtained at the deformable mirror 10.

According to the configuration of the above, the deformable mirror system of the embodiment detects the deformation quantity by using the capacitance, also corrects the non-linearity existing in the relationship between the capacitance and the deformation quantity, and may perform control which is excellent in linearity. Thus, the system may precisely drive the deformable mirror 10 as well.

In a case in which the system performs control so as to follow the target signal through such feedback control performed in the embodiment, an operational frequency band of a feedback loop is generally needed to become sufficiently wider than the frequency band of the target signal. However, in the embodiment, the system disposes the compensator 34 outside the feedback loop. Therefore, even if the operation speed of the compensator 34 is slower than the case in which the system disposes the compensator 34 inside the feedback loop, the system may perform feedback control having excellent linearity. As long as the magnitude of the target deformation quantity signal 32 does not vary, the magnitude of the target capacitance signal 33 corresponding to the target deformation quantity signal 32 also does not vary. Thus, the system may be configured to operate the compensator 34 only when the target deformation quantity signal 32 has varied. Also in such a configuration, the operation speed of the compensator 34 may be set to a low speed.

Configuration of the conversion table for use in the compensation by the compensator 34 which is composed of a memory capable of rewriting the memory 36 enables appropriately updating the conversion table in accordance with a property change of the deformable mirror 10. For instance, using a measuring instrument (not shown) measuring the deformation quantity of the deformation part 21 of the deformable mirror 10 to write the relationship between the output from the measurement instrument and the output value from the capacitance detector 29 in the memory 36 composing the conversion table of the compensator 34 enables updating the compensation table. This update of the compensation table may be executed in shipment of the deformable mirror 10 from a factory, and may be executed as a calibration operation right after the power is turned on when the compensation table is in use.

In the same way, configuration of the memory 41 by using a rewritable memory, enables updating the parameters $\in$, A, $d_0$ of the computation unit 40 of the memory 41.

Disposing a plurality of the second electrodes 14 on the electrode substrate 11 to connect the capacitance detector 29 to each of the second electrodes 14 makes it possible to detect the deformation quantities at a plurality of points of the deformable mirror 10. Further, disposing a plurality of third electrodes 15 on the electrode substrate 11 and connecting the amplifier 28 to each of the third electrodes 15 makes it possible to change the deformation shape of the deformation part 21 of the deformable mirror 10.

Modification Example

Figure 6:
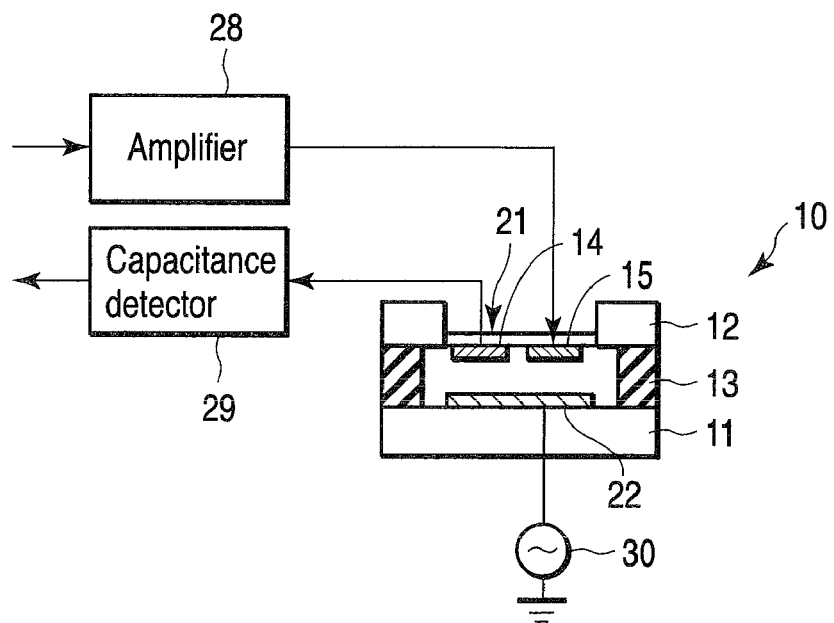
FIG. 6 is an exemplary view depicting a configuration of a modification example of the deformable mirror system of the first embodiment.

While the embodiment has been described the case in which the first electrode 22 is arranged at the deformation part 21, the second and the third electrodes 14, 15 are arranged on the electrode substrate 11, it is also possible to dispose the second and the third electrodes 14, 15 on the deformation part 21 and the first electrode 22 on the electrode substrate 11 as shown in FIG. 6. In this case, the deformation part 21 is deformed due to the voltage applied to the third electrode 15, and the second electrode 14 moves while the deformation part 21 is deformed. Therefore, the deformable mirror drive device can detect the deformation quantity of the deformation part 21 by detecting the capacitance between the first electrode 22 and the second electrode 14. Other operations are implemented in the ways mentioned above.

Figure 7:
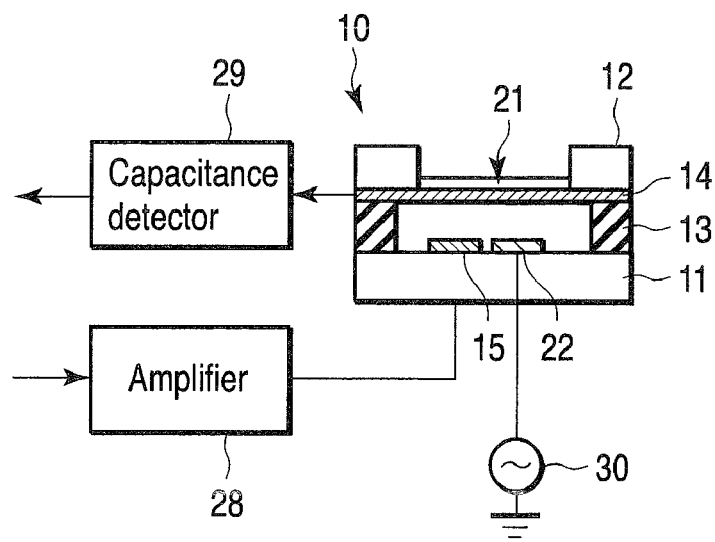
FIG. 7 is an exemplary view depicting a configuration of another modification example of the deformable mirror system of the first embodiment.

As shown in FIG. 7, the configuration in which the first and the third electrode 22, 15 are arranged on the electrode substrate 11, and the second electrode 14 is arranged at the deformation part 21 may produce a similar effect. In this case, the capacitance detector 29 is connected to the second electrode 14, and the potential of the second electrode 14 is fixed to zero potential or fixed potential. The potential applied to the third electrode 15 generates a potential difference between the second and the third electrodes 14, 15 to deform the deformation part 21. With deformation, the capacitance between the first electrode 22 and the second electrode 14 changes, and the capacitance detector 29 detects the change.

Figure 8:
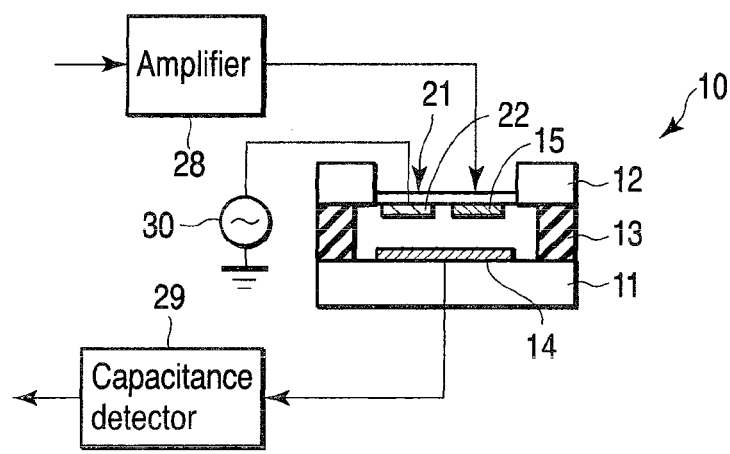
FIG. 8 is an exemplary view depicting a configuration of further modification example of the deformable mirror system of the first embodiment.

As shown in FIG. 8, the configuration which arranges the first and the third electrodes 22, 15 at the deformation part 21 and arranges the second electrode 14 on the electrode substrate 11 also produces a similar effect on the deformable mirror drive device.

Second Embodiment

A deformable mirror system of a second embodiment of the invention will be described. However, descriptions of the components identical to those of the first embodiment will be eliminated.

Figure 9:
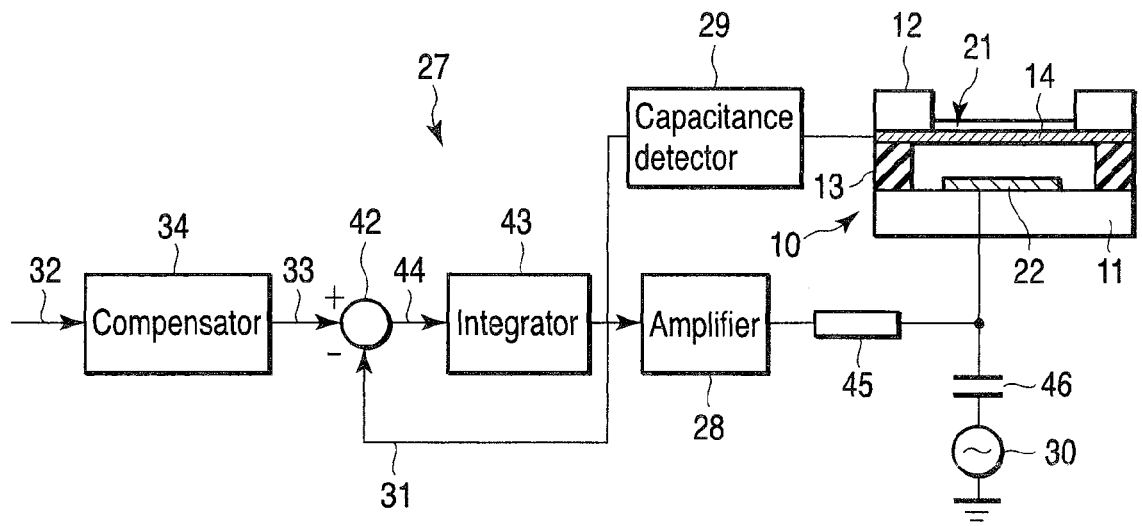
FIG. 9 is an exemplary view depicting a configuration of a deformable mirror system of a second embodiment.

In the deformable mirror system of the second embodiment, the deformable mirror 10 arranges, as shown in FIG. 9, the second electrode 14 at the deformation part 21, and arranges the first electrode 22 on the electrode substrate 11.

In the deformable mirror drive device 27, an output from the amplifier 28 is connected to the first electrode 22 of the deformable mirror 10 through a coupling resistor 45, and the reference signal generator 30 is also connected thereto through a coupling capacitor 46. The capacitance detector 29 is connected to the second electrode 14 of the deformable mirror 10, and the second electrode 14 is fixed to zero potential or fixed potential by the capacitance detector 29.

The coupling resistor 45 and the coupling capacitor 46 apply a signal in which the reference signal that is the output from the reference signal generator 30 is overlapped with the drive signal output from the amplifier 28 to the first electrode 22. In the low-frequency band in which the drive signal generated from the amplifier 28 is present, since the coupling capacitor 46 may be assumed to be almost open, the drive signal is supplied to the first electrode 22. In the high-frequency band in which the reference signal is present, since the impedance of the coupling capacitor 46 becomes fully lower than the resistance of the coupling resistor 45, the reference signal is supplied to the first electrode 22. Taking an entire frequency band into account by putting together the descriptions above overlaps the drive signal in the low frequency with the reference signal of the high frequency, and makes it equivalent to the case that the overlapped signal is applied to the second electrode 14.

In the deformable mirror system of the configuration shown in FIG. 9, in a low-frequency band, a potential difference occurs between the first electrode 22 and the second electrode 14 due to the drive signal output from the amplifier 28 to deform the deformation part 21 of the deformable mirror 10 by electrostatic power. In a high-frequency band, detecting the electric current flowing to the capacitance by means of the capacitance detector 29, or detecting the electric charge charged in the capacitance by means of the capacitance detector 29 makes it possible to detect the capacitance between the first electrode 22 and the second electrode 14.

As described above, using the coupling resistor 45 and the coupling capacitor 46 enables easily applying the high voltage and detecting the capacitance to and from the same electrode (in this case, the first electrode 22) without using an operational amplifier of high breakdown voltage.

The target deformation quantity signal 32 input from outside is converted into the target capacitance signal 33 through the compensator 34, in the same way of the first embodiment. The comparator 42 compares the target capacitance signal 33 and the capacitance signal 31 detected by the capacitance detector 29 to output the comparison result to the integrator 43. The output from the integrator 43 is amplified by means of the amplifier 28 to be applied to the first electrode 22 through the coupling resistor 45.

According to the aforementioned configuration, the deformable mirror system of the second embodiment decides the voltage of the first electrode 22 so as to obtain the deformation quantity equivalent to the target deformation quantity signal 32 from the deformation quantity of the deformable mirror 10. Thus, the system may compensate the non-linearity existing in the relationship between the capacitance and the deformation quantity, perform control with excellent linearity, and precisely drive the deformable mirror 10 as well.

Modification Example

A configuration, shown in FIG. 10, which arranges the first electrode 22 at the deformation part 21 and arranges the second electrode 14 on the electrode substrate 11, may produce the same effect.

As shown FIG. 11, the reference signal generator 30 may be connected to the first electrode 22 arranged at the deformation part 21, the output from the amplifier 28 may be connected to the second electrode 14 arranged on the electrode 11 through the coupling resistor 45, and also the capacitance detector 29 may be connected to the second electrode 14 through the coupling capacitor 46. In this configuration produces the same effect. In a case of this configuration, in the low-frequency band in which the drive signal generated from the amplifier 28 is present, since the coupling capacitor 46 may be assumed to the almost open, the drive signal is not supplied to the capacitance detector 29 but supplied to the second electrode 14. In the high-frequency band in which the reference signal generated from the reference signal generator 30, the impedance of the coupling capacitor 46 becomes fully lower than the resistance of the coupling resistor 45. Therefore, the current signal flowing to the capacitance and an electric charge thereof which is intended to detect by the capacitance detector 29 is input to the capacitance detector 29 through the coupling capacitor 46. Taking the entire frequency band by putting the above descriptions together into account makes the deformable mirror system supply the drive signal of the low frequency to the second electrode 14 without supplying the drive signal to the capacitance detector 29, and makes the system supply the detection signal such as a current signal output from the second electrode 14 to the capacitance detector 29 without flowing to the amplifier 28. Thus the system may detect the applying of the high voltage and the capacitance for the same electrode (in this case, the second electrode 14).

As shown in FIG. 12, a configuration which disposes the first electrode 22 on the electrode substrate 11 and disposes the second electrode 14 at the deformation part 21 produces the same effect.

While the invention has been described on the basis of the embodiments, the invention is not limited to the foregoing embodiments, various modifications and applications also may be achieved without departing from the substance of the invention.

For instance, the target deformation quantity signal 32 which is input from outside is not limited to the analog signal, if the signal 32 is input as digital data; it is needless to say that the analog-to-digital converter 35 of the compensator 34 can be eliminated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A deformable mirror system comprising:
    a deformable mirror which comprises a deformation part with a reflection surface formed thereon, a fixing part configured to fix the deformation part, and a pair of electrodes disposed facing the deformation part and the fixing part, respectively;
    a drive unit configured to generate drive force so as to deform the deformation part;
    a capacitance detection unit configured to detect capacitance between the pair of electrodes;
    a conversion unit configured to convert a target deformation quantity signal into a target capacitance signal on the basis of a relationship between the capacitance and deformation quantity of the deformation part; and
    a control unit configured to decide drive force generated from the drive unit so as to coincide an output from the conversion unit with an output from the capacitance detection unit.

2. The system according to claim 1, wherein
the conversion unit includes a memory configured to store a table of a relationship between the capacitance and the deformation quantity of the deformation part.

3. The system according to claim 2, wherein
the pair of the electrodes includes a first electrode disposed at the deformation part and a second electrode disposed on the fixing part so as to face the first electrode,
the deformable mirror system further comprises a reference signal generation unit, which is connected to the first electrode, configured to generate a reference signal for use in detection of capacitance, and
the capacitance detection unit is connected to the second electrode to detect capacitance between the first electrode and the second electrode.

4. The system according to claim 3, wherein
the deformable mirror further includes a third electrode which is disposed on the fixing part so as to face the first electrode, and
the drive unit drives the deformation part by applying a voltage to the third electrode.

5. The system according to claim 3, wherein
the deformable mirror further comprises a third electrode which is disposed on the deformation part so as to face the second electrode, and
the drive unit drives the deformation part by applying a voltage to the third electrode.

6. The system according to claim 3, wherein
the reference signal generation unit is connected to the first electrode though a capacitor, and
the drive unit is connected to the first electrode through a resistor to drive the deformation part by applying a voltage to the first electrode.

7. The system according to claim 3, wherein
the capacitance detection unit is connected to the second electrode through a capacitor, and
the drive unit is connected to the second electrode through a resistor to drive the deformation part by applying a voltage to the second electrode.

8. The system according to claim 2, wherein
the pair of the electrodes includes a first electrode disposed on the fixing part and a second electrode disposed on the deformation part so as to face the first electrode,
the deformable mirror system further comprises a reference signal generation unit, which is connected to the first electrode, configured to generate a reference signal for use in detection of the capacitance, and
the capacitance detection unit is connected to the second electrode to detect capacitance between the first electrode and the second electrode.

9. The system according to claim 8, wherein
the deformable mirror further includes a third electrode which is disposed on the deformation part so as to face the first electrode, and the drive unit drives the deformation part by applying a voltage to the third electrode.

10. The system according to claim 8, wherein
the deformable mirror further comprises a third electrode which is disposed on the fixing part so as to face the second electrode, and
the drive unit drives the deformation part by applying a voltage to the third electrode.

11. The system according to claim 8, wherein
the reference signal generation unit is connected to the first electrode though a capacitor, and
the drive unit is connected to the first electrode through a resistor to drive the deformation part by applying a voltage to the first electrode.

12. The system according to claim 8, wherein
the capacitance detection unit is connected to the second electrode through a capacitor, and
the drive unit is connected to the second electrode through a resistor to drive the deformation part by applying a voltage to the second electrode.

13. The system according to claim 1, wherein
the conversion unit includes memory configured to store parameters of a function showing the relationship between the capacitance and the deformation quantity of the deformation part; and a computation unit configured to perform computation of the capacitance and the deformation quantity of the deformation part by using the parameters stored in the memory.

14. The system according to claim 13, wherein
the pair of the electrodes includes a first electrode disposed at the deformation part and a second electrode disposed on the fixing part so as to face the first electrode,
the deformable mirror system further comprises a reference signal generation unit, which is connected to the first electrode, configured to generate a reference signal for use in detection of capacitance, and
the capacitance detection unit is connected to the second electrode to detect capacitance between the first electrode and the second electrode.

15. The system according to claim 14, wherein
the deformable mirror further includes a third electrode which is disposed on the fixing part so as to face the first electrode, and
the drive unit drives the deformation part by applying a voltage to the third electrode.

16. The system according to claim 14, wherein
the deformable mirror further comprises a third electrode which is disposed on the deformation part so as to face the second electrode, and
the drive unit drives the deformation part by applying a voltage to the third electrode.

17. The system according to claim 14, wherein
the reference signal generation unit is connected to the first electrode though a capacitor, and
the drive unit is connected to the first electrode through a resistor to drive the deformation part by applying a voltage to the first electrode.

18. The system according to claim 14, wherein
the capacitance detection unit is connected to the second electrode through a capacitor, and
the drive unit is connected to the second electrode through a resistor to drive the deformation part by applying a voltage to the second electrode.

19. The system according to claim 13, wherein
the pair of the electrodes includes a first electrode disposed on the fixing part and a second electrode disposed on the deformation part so as to face the first electrode,
the deformable mirror system further comprises a reference signal generation unit, which is connected to the first electrode, configured to generate a reference signal for use in detection of the capacitance, and
the capacitance detection unit is connected to the second electrode to detect capacitance between the first electrode and the second electrode.

20. The system according to claim 19, wherein
the deformable mirror further includes a third electrode which is disposed on the deformation part so as to face the first electrode, and
the drive unit drives the deformation part by applying a voltage to the third electrode.

21. The system according to claim 19, wherein
the deformable mirror further comprises a third electrode which is disposed on the fixing part so as to face the second electrode, and
the drive unit drives the deformation part by applying a voltage to the third electrode.

22. The system according to claim 19, wherein
the reference signal generation unit is connected to the first electrode though a capacitor, and
the drive unit is connected to the first electrode through a resistor to drive the deformation part by applying a voltage to the first electrode.

23. The system according to claim 19, wherein
the capacitance detection unit is connected to the second electrode through a capacitor, and
the drive unit is connected to the second electrode through a resistor to drive the deformation part by applying a voltage to the second electrode.

24. The system according to one of claims 1 to 3, wherein
the pair of the electrodes includes a first electrode disposed at the deformation part and a second electrode disposed on the fixing part so as to face the first electrode,
the deformable mirror system further comprises a reference signal generation unit, which is connected to the first electrode, configured to generate a reference signal for use in detection of capacitance, and
the capacitance detection unit is connected to the second electrode to detect capacitance between the first electrode and the second electrode.

25. The system according to claim 24, wherein
the deformable mirror further includes a third electrode which is disposed on the fixing part so as to face the first electrode, and
the drive unit drives the deformation part by applying a voltage to the third electrode.

26. The system according to claim 24, wherein
the deformable mirror further comprises a third electrode which is disposed on the deformation part so as to face the second electrode, and
the drive unit drives the deformation part by applying a voltage to the third electrode.

27. The system according to claim 24, wherein
the reference signal generation unit is connected to the first electrode though a capacitor, and
the drive unit is connected to the first electrode through a resistor to drive the deformation part by applying a voltage to the first electrode.

28. The system according to claim 24, wherein
the capacitance detection unit is connected to the second electrode through a capacitor, and
the drive unit is connected to the second electrode through a resistor to drive the deformation part by applying a voltage to the second electrode.

29. The system according to claim 1, wherein the pair of the electrodes includes a first electrode disposed on the fixing part and a second electrode disposed on the deformation part so as to face the first electrode, the deformable mirror system further comprises a reference signal generation unit, which is connected to the first electrode, configured to generate a reference signal for use in detection of the capacitance, and the capacitance detection unit is connected to the second electrode to detect capacitance between the first electrode and the second electrode.

30. The system according to claim 29, wherein the deformable mirror further includes a third electrode which is disposed on the deformation part so as to face the first electrode, and the drive unit drives the deformation part by applying a voltage to the third electrode.

31. The system according to claim 29, wherein the deformable mirror further comprises a third electrode which is disposed on the fixing part so as to face the second electrode, and the drive unit drives the deformation part by applying a voltage to the third electrode.

32. The system according to claim 29, wherein the reference signal generation unit is connected to the first electrode though a capacitor, and the drive unit is connected to the first electrode through a resistor to drive the deformation part by applying a voltage to the first electrode.

33. The system according to claim 29, wherein the capacitance detection unit is connected to the second electrode through a capacitor, and the drive unit is connected to the second electrode through a resistor to drive the deformation part by applying a voltage to the second electrode.

34. A deformable mirror drive device comprising:

a drive unit configured to generate drive force so as to deform a deformation part of a deformable mirror which includes the deformation part with a reflection surface formed thereon, a fixing part configured to fix the deformation part, and a pair of electrodes disposed so as to face the deformation part and the fixing part, respectively;

a capacitance detection unit configured to detect capacitance between the pair of the electrodes of the deformable mirror;

a conversion unit configured to convert a target deformation quantity signal into a target capacitance signal on the basis of a relationship between the capacitance and deformation quantity of the deformation part; and a control unit configured to decide drive force generated from the drive unit so as to coincide an output from the conversion unit with an output from the capacitance detection unit.

* * * * *